UNITED STATES PATENT OFFICE.

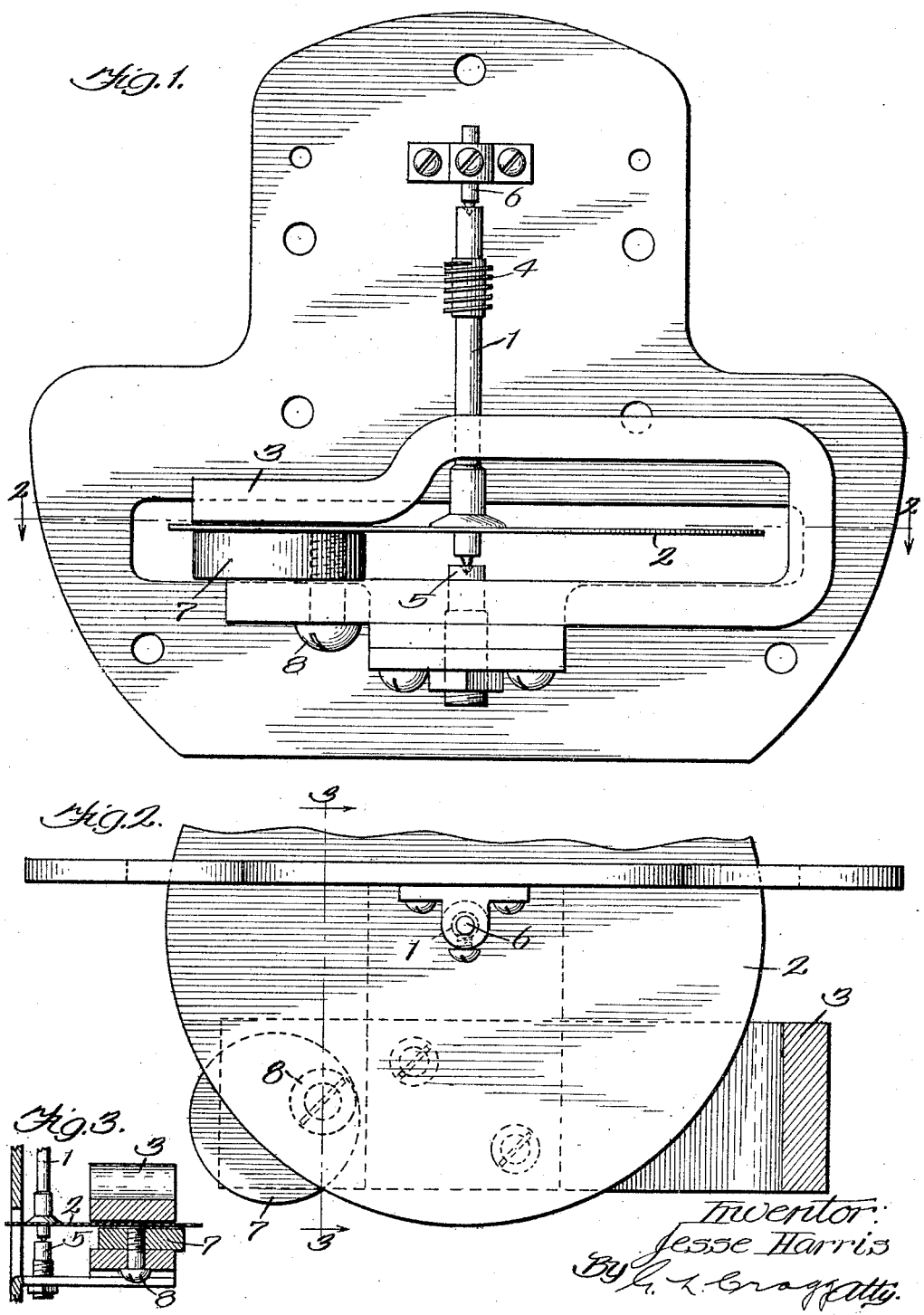

JESSE HARRIS, OF LA FAYETTE, INDIANA, ASSIGNOR TO DUNCAN ELECTRIC MANUFACTURING COMPANY, OF LA FAYETTE, INDIANA, A CORPORATION OF ILLINOIS.

ELECTRICITY-METER.

1,332,464.   Specification of Letters Patent.   Patented Mar. 2, 1920.

Application filed November 14, 1918. Serial No. 262,491.

*To all whom it may concern:*

Be it known that I, JESSE HARRIS, citizen of the United States, residing at La Fayette, in the county of Tippecanoe and State of Indiana, have invented a certain new and useful Improvement in Electricity-Meters, of which the following is a full, clear, concise, and exact description.

My invention relates to electricity meters employing motor driven counting trains and damping magnets and disks to modify the rotation of the rotatable elements of the motor members of the meters. Hitherto metallic damping disks, carried upon the spindles of the meters, have rotated in the presence of fields furnished by permanent damping magnets which were made entirely adjustable to vary the dragging effect thereof upon such disks.

In accordance with my present invention, instead of adjusting the entire damping magnet, I adjust at least one polar portion with respect to the balance of the magnet and thereby accomplish the same result that was hitherto accomplished by the adjustment of the entire magnet. This adjustable polar portion is desirably a disk of soft iron mounted to turn about an axis which is eccentric to this polar disk and which axis is perpendicular to the plane of rotation of the damping disk upon the armature spindle. By this arrangement the pole piece is adjustable in a plane parallel with the plane of the disk to vary the location of the total magnet flux with respect to the disk, thereby to enable the flux to effect the desired modification of the speed of the armature spindle without requiring the adjustment of the entire damping magnet. This arrangement simplifies the mounting for the magnet and simplifies the adjustment of the damping flux.

I will explain my invention more fully by reference to the accompanying drawing showing the preferred embodiment thereof and in which Figure 1 is a front view of enough of a meter to illustrate my invention; Fig. 2 is a view partially in plan and partially in section on line 2—2 of Fig. 1; and Fig. 3 is a view, on a smaller scale, on line 3—3 of Fig. 2.

Like parts are indicated by similar characters of reference throughout the different figures.

The meter portion shown pertains to an alternating current watt meter, but the invention is not to be limited to the character of current in connection with which the meter is employed. The upright spindle 1 carries a metallic disk 2 usually made of aluminum. This disk, in an alternating current meter, is subject to the torque due to the co-operation of magnetic fields that are produced by windings respectively subject to alternating current and the pressure thereof, and, in the embodiment of the invention illustrated, also rotates within the presence of a damping permanent magnet 3 properly to modify the rate of rotation of the disk and the spindle which carries it. This spindle may be provided with a worm 4 in driving relation to the usual counting train, not shown. The lower end of the spindle is stepped into a suitable step bearing 5 and the upper end of the spindle is engaged by an end bearing 6, these bearings being arranged vertically to support the meter spindle in an upright or vertical position. The disk 2, so far as the present invention is concerned, is a damping disk and while it is herein described as also serving as an armature of the meter, such disk is not to be limited to this extra function.

The damping magnet 3 is desirably of U-shape to provide two parallel polar portions between which the disk turns, there being a gap between these polar portions that is parallel with the disk and in which such disk moves. This magnet is permanently magnetized. It has a pole piece 7 which is preferably a block of soft iron. This pole piece is spaced apart from the remaining pole piece of the magnet to afford the desired air gap in which the disk turns without contact with the magnet. The polar block or disk 7 is preferably secured to the lower limb of the magnet by means of the screw 8 that passes freely through this limb of the magnet but is in threaded connection with the disk 7. This screw is upright and affords a vertical axis of movement for the pole piece 7 and is eccentric with respect to this pole piece. In other words this screw 8 affords an axis of rotation for the polar block 7 that is eccentric with respect to that geometrical axis of the block which is perpendicular to the horizontal faces of the block and the plane of rotation of the brake disk 2 and about which geometrical axis the parts of the block on various opposite sides of such axis are substantially symmetrically disposed. The term "geometrical axis" is used in the claims in this sense. When the screw is loosened, the polar disk may be turned upon its axis of movement whereby more or less of such pole piece is presented to the disk. After the desired angular adjustment of the polar disk has been secured the screw 8 may again be tightened. By this arrangement substantially the same result is secured as is secured by the adjustment of an entire damping magnet, but the mounting of the magnet is, because of the presence of the adjustable polar disk, much simplified. Moreover, the adjustment of the effect of the magnet upon the disk is more readily obtained.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. An electricity meter including an armature spindle; a metallic damping disk upon the armature spindle; and a damping permanent magnet furnishing magnet flux through which said disk turns and having a soft iron block polar portion provided with a mounting upon the balance of the magnet and upon which mounting this polar portion may be turned in a plane parallel with the plane of rotation of the damping disk, said mounting furnishing an axis of movement for the polar block portion that is eccentric with respect to the geometrical axis of said polar block portion that is perpendicular to the plane of the damping disk.

2. An electricity meter including an armature spindle; a metallic damping disk upon the armature spindle; and a damping permanent magnet furnishing magnet flux through which said disk turns and having a block polar portion provided with a mounting upon the balance of the magnet and upon which mounting this polar portion may be turned in a plane parallel with the plane of rotation of the damping disk, said mounting furnishing an axis of movement for the polar block portion that is eccentric with respect to the geometrical axis of said polar block portion that is perpendicular to the plane of the damping disk.

In witness whereof I hereunto subscribe my name this sixth day of November, A. D. 1918.

JESSE HARRIS.